United States Patent [19]

Shibata et al.

[11] Patent Number: 5,847,843
[45] Date of Patent: Dec. 8, 1998

[54] FACSIMILE APPARATUS CAPABLE OF CONNECTING WITH COMPUTER

[75] Inventors: Koichi Shibata; Masakazu Oyama; Mitsuhiro Nakamura; Toshihiro Mori, all of Osaka, Japan

[73] Assignee: Mita Industrial Co., Ltd., Japan

[21] Appl. No.: 747,719

[22] Filed: Nov. 12, 1996

Related U.S. Application Data

[63] Continuation of Ser. No. 344,664, Nov. 22, 1994, abandoned.

[30] Foreign Application Priority Data

Nov. 24, 1993 [JP] Japan ................................. 5-293635
Nov. 24, 1993 [JP] Japan ................................. 5-293637

[51] Int. Cl.$^6$ ................................................ H04N 1/32
[52] U.S. Cl. ........................ 358/440; 358/407; 358/442
[58] Field of Search ............................ 395/114; 358/407, 358/440, 442, 468; 379/100, 100.01, 100.02, 100.12; H04N 1/32, 1/333

[56] References Cited

U.S. PATENT DOCUMENTS

| H1677 | 9/1997 | Hu et al. ................................. 358/442 |
| 4,652,933 | 3/1987 | Koshiishi . |
| 4,710,951 | 12/1987 | Itezono . |
| 4,816,911 | 3/1989 | Kirsch et al. ........................... 379/100 |
| 4,964,154 | 10/1990 | Shimotono ............................. 379/100 |
| 4,991,200 | 2/1991 | Lin ........................................ 358/468 |
| 5,270,834 | 12/1993 | Kuwahara .............................. 358/440 |
| 5,274,467 | 12/1993 | Takehiro et al. ....................... 358/440 |
| 5,406,387 | 4/1995 | Yamamoto ............................. 358/407 |
| 5,624,194 | 4/1997 | Matsuzawa . |
| 5,684,864 | 11/1997 | Shibata ................................... 358/442 |

FOREIGN PATENT DOCUMENTS

WO 92/12591 7/1992 WIPO .
WO 93/20647 10/1993 WIPO .

OTHER PUBLICATIONS

Pung, H.K., et al., "Development of a facsimile service for TCP/IP networks," *Computer Communications*, vol. 15, No. 10, Dec. 1992, pp. 646–653.

Rafferty, James P., "Fax Servers Gain a Routing Standard," *Data Communications*, vol. 22, No. 12, Sep. 1993, pp. 53–54 & 56.

"Using A Facsimile Machine As A System Printer," *IBM Technical Disclosure Bulletin*, vol. 33, No. 10A, Mar. 1991, pp. 71–74.

Primary Examiner—Kim Yen Vu
Attorney, Agent, or Firm—Rabin & Champagne, P.C.

[57] ABSTRACT

A facsimile apparatus which enables the printer section and document original reading section thereof to be used as a printer and image reader, respectively, for a personal computer. To use the reading section for reading a document original as the image reader for the personal computer, the operation mode of the facsimile apparatus is switched from an ordinary operation mode to a PC-FAX mode. When a document original is read by the reading section in the PC-FAX mode, the facsimile apparatus behaves as if it received a call-in of facsimile correspondence, and sends image data to the personal computer. Further, by operating an operation section, a printer function call number is registered for an external input printing function which enables information input to an interface to be printed out. When a call-out command designating a phone number is sent to the facsimile apparatus from the personal computer, a control section judges if the phone number agrees with the printer function call number. If the input number agrees with the printer function call number, information input from the personal computer is printed out by a printer section.

6 Claims, 6 Drawing Sheets

FACSIMILE APPARATUS CAPABLE OF CONNECTING WITH COMPUTER

This application is a continuation of application Ser. No. 08/344,664 filed Nov. 22, 1994, now abandoned.

BACKGROUND OF THE INVENTION

1. Field of the Invention

The present invention relates to a facsimile apparatus capable of connecting with an information processing apparatus such as a personal computer and performing data communications therebetween.

2. Description of the Prior Art

A function of carrying out a direct facsimile transmission of a document prepared by means of a personal computer and receiving image data transmitted from a facsimile apparatus via a telephone line is referred to as PC-FAX. To realize the PC-FAX function, a personal computer is connected through a fax modem having a facsimile communication function to a telephone line or, alternatively, connected to a facsimile apparatus having a data communication interface such as an RS-232C interface.

An operation of taking information received by a facsimile apparatus into a personal computer is as follows. First, the operation mode of the facsimile apparatus is switched from an ordinary operation mode to a PC-FAX mode. The PC-FAX mode can be set by sending an instruction in a form of a control command called AT command from the personal computer. In the PC-FAX mode, information received in accordance with a facsimile communication procedure is sent to the personal computer. On the other hand, information received in the ordinary operation mode is printed out in a printer section of the facsimile apparatus.

The procedure of transmitting via the facsimile apparatus a document prepared by means of the personal computer is as follows. First, a document file to be transmitted is prepared by means of the personal computer. Then, the personal computer controls the facsimile apparatus by way of a control command called AT command to give the facsimile apparatus a phone number of a recipient facsimile apparatus and an instruction to carry out a facsimile transmission. In response thereto, the facsimile apparatus calls out the recipient facsimile apparatus, and carries out facsimile transmission of data sent from the personal computer via a data communication interface.

The facsimile apparatus typically comprises a document original reading section for reading a document original to be transmitted and a printer section for printing out an image transmitted thereto via a telephone line. On the other hand, the personal computer to be connected to the facsimile apparatus is typically connected to a printer, and sometimes connected to an image scanner for reading an image.

Since the facsimile apparatus includes the printer section having a printing function, the printer separately connected to the personal computer is redundant and is not useful.

Further, the document original reading section of the facsimile apparatus and the image scanner both have a function of optically reading a document original to generate image data. Therefore, a system arrangement having both of them is redundant and is not useful.

In order to efficiently share system resources, it is advantageous that the printer section and document original reading section of the facsimile apparatus are allowed to be used as a printer and image scanner, respectively, for the personal computer, not limited to the dedicated use for the facsimile apparatus.

In this case, however, a special command is required for printing out data sent from the personal computer. Since such a special command is not included in the widely used conventional AT command system, it is necessary to alter the AT command system.

Further, the personal computer should control the facsimile apparatus so that image data of a document original read by the document original reading section of the facsimile apparatus is sent to the personal computer and, therefore, another special command is required for realizing this operation. However, such a special command is not included in the widely used conventional AT command system, thereby necessitating the alteration of the AT command system.

Accordingly, there has been a difficulty in using the printer section and document original reading section of the facsimile apparatus as a printer and image scanner, respectively, for the personal computer.

SUMMARY OF THE INVENTION

To solve the aforesaid technical difficulty, it is an object of the present invention to provide a facsimile apparatus which facilitates the sharing of a printer section thereof to be used as a printer means for an external information processing apparatus.

It is another object of the present invention to provide a facsimile apparatus which facilitates the sharing of a document original reading section thereof to be used as an image reading means for an external information processing apparatus.

In accordance with one aspect of the present invention, there is provided a facsimile apparatus comprising an information input section for receiving information input therein from an external information processing apparatus such as a computer, a facsimile functional section, a printer section for printing out an image, and a number registry section.

The number registry section accepts the registration of a printing function call number relative to an external input printing function for printing out information sent from the external information processing apparatus in the printer section of the facsimile apparatus.

When information is input from the external information processing apparatus to the information input section of the facsimile apparatus, with the printing function call number being designated, the input information is printed out by the printer section. This enables desired information to be printed out according to substantially the same procedure as that employed for facsimile communications, by controlling the facsimile apparatus from the external information processing apparatus.

When information is input from the external information processing apparatus with a phone number other than the printing function call number being designated, the facsimile functional section calls out a recipient terminal having the designated phone number, and carries out facsimile transmission of information sent from the external information processing apparatus to the information input section.

In accordance with another aspect of the present invention, there is provided a facsimile apparatus comprising an information output section for outputting information to an external information processing apparatus, a document original reading section, and a facsimile functional section, the facsimile apparatus being capable of selecting the operation mode thereof as between first and second operation modes. When a document original is read by means of the document original reading section in the first operation mode, information of the document original is sent out to a telephone line by the operation of the facsimile functional section. On the other hand, when a document original is read by means of the document original reading section in the second operation mode, information of the document original is output to the external information processing apparatus from the information output section.

Therefore, if the document original is read in a state where the operation mode of the facsimile apparatus is set to the second operation mode, the information of the document original can be sent to the external information processing apparatus from the information output section. This means that the document original reading section of the facsimile apparatus can be utilized as an image reading means for the information processing apparatus.

DETAILED DESCRIPTION OF THE PREFERRED EMBODIMENTS

Figure 1:
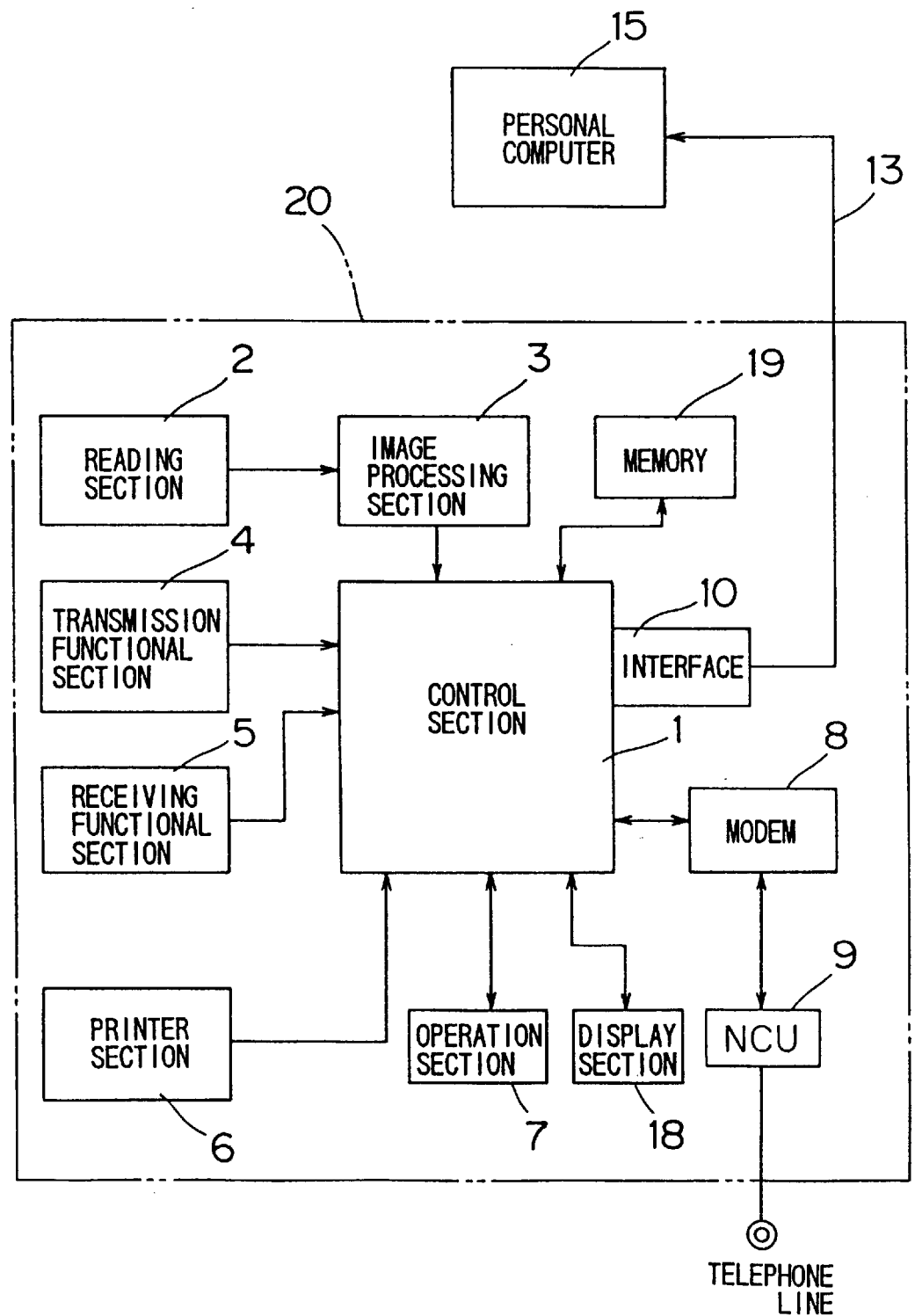
FIG. 1 is a block diagram illustrating an electrical construction of a facsimile apparatus according to one embodiment of the present invention to which a personal computer is connected.

FIG. 1 is a block diagram illustrating an electrical construction of a facsimile apparatus according to an embodiment of the present invention. A facsimile apparatus 20 comprises a control section 1 to which is connected such members as a personal computer that is adapted to receive image data sent from an image processing section 3. The image processing section 3 performs predetermined image processing, such as gray-scale image processing, on output signals of a reading section 2 which optically reads a document original to be transmitted, so as to prepare image data. To the control section 1 are connected a transmission functional section 4 for encoding image data by way of a predetermined encoding method and generating a control signal required for facsimile communications, a receiving functional section 5 for decoding received codes into image data and implementing a receive controlling procedure, a printer section 6 for printing such information as a received image, on a paper sheet, an operation section 7 having such members as a keyboard, a display section 18 including, for example, a liquid crystal display device, and a memory 19 for storing a printer function call number and/or scanner function call number which will be described later. The control section 1 is connected to a telephone line via a modem 8 and network control unit (NCU) 9.

The control section 1 has an interface 10, such as an RS-232C, for data communications. The interface 10 serves as an information output port, and enables the control section 1 to be connected to a personal computer 15 of an external information processing apparatus, via a communication cable 13.

With this arrangement, the personal computer 15 can control the facsimile apparatus 20 by way of so-called AT commands to carry out facsimile communications through the facsimile apparatus 20, thereby realizing a so-called PC-FAX function.

More specifically, the operation mode of the facsimile apparatus 20 is first switched from an ordinary operation mode of a first operation mode to a PC-FAX mode of a second operation mode. When the personal computer 15 sends a call-out command, a phone number and transmission information, to the interface 10 via the communication cable 13, the control section 1 calls out a recipient terminal via a telephone line. After the line connection is established, the control section 1 sends out to the telephone line the transmission information input from the personal computer 15 via the interface 10. On the other hand, when the personal computer 15 sends to the control section 1 a control command instructing the latter to stand by for receiving information in the PC-FAX mode, the control section 1 sends received information to the personal computer 15 via the interface 10 in response to a call-in.

In the ordinary operation mode, data is not transmitted between the facsimile apparatus 20 and the personal computer 15. Accordingly, signals indicative of information of a document original read by the reading section 2 are sent to a telephone line, while image data received from a telephone line is printed out in the printer section 6.

In addition to the aforesaid PC-FAX function, the facsimile apparatus 20 of the present invention has an external input printing function which enables the printer section 6 to print out information sent from the personal computer 15. That is, the printer section 6 of the facsimile apparatus 20 also serves as a printer for the personal computer 15. In other words, the sharing of the printer section 6 can be realized.

To use the printer section 6 as the printer for the personal computer 15, the control section 1 identifies a particular number input to the interface 10 as a printer function call number, and when a call-out request accompanying the printer function call number is made, the control section 1 allows the printer section 6 to perform a printing operation instead of performing a call-out operation.

Further, the facsimile apparatus 20 of the present invention has a scanner function for sending image data of a document original read by the reading section 2 to the personal computer 15 via the interface 10. That is, the reading section 2 of the facsimile apparatus 20 also serves as an image scanner for the personal computer 15. In other words, the sharing of the reading section 2 can be realized.

To use the reading section 2 as the image scanner for the personal computer 15, the control section 1 identifies a particular number input from the operation section 7 as a scanner function call number, and when a transmission operation is performed with the printer function call number being designated, the control section 1 sends image data of a document original read by the reading section 2 to the personal computer 15 from the interface 10 instead of performing a call-out operation. That is, the facsimile apparatus 20 behaves as if it sent call-in data to the personal computer 15, and the personal computer 15 performs exactly the same operation as when receiving call-in data. Thus, the personal computer 15 can obtain the image data of the document original read by the reading section 2 of the facsimile apparatus 20.

Figure 2:
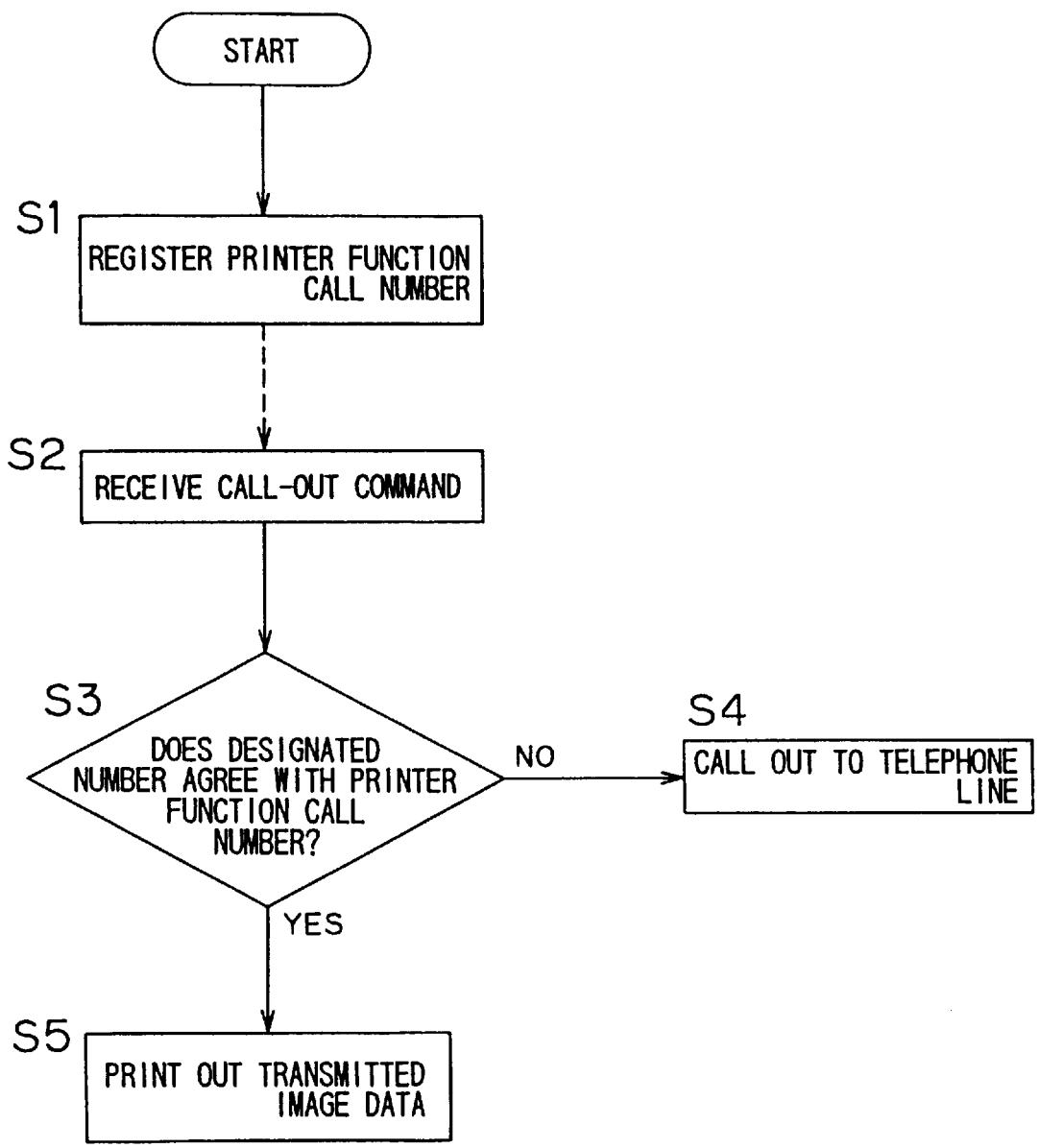
FIG. 2 is a flow chart for explaining the operation of a facsimile apparatus in relation to the sharing of a printer section 6 thereof.

FIG. 2 is a flow chart for explaining the operation of the facsimile apparatus 20 in relation to the sharing of the printer section 6 thereof. To use the printer section 6 of the facsimile apparatus 20 as a printer for the personal computer 15, a user registers a printer function call number (step S1). That is, when the user inputs a particular phone number by operating the operation section 7, the input number is registered as the printer function call number in the memory 19.

When receiving a call-out command via the interface 10 after the completion of the registration (step S2), the control section 1 judges if a phone number designated by the call-out command agrees with the printer function call number registered in the memory 19 (step S3). If the designated phone number does not agree with the printer function call number (if NO in step S3), a facsimile transmission is implemented in accordance with a facsimile communication procedure. That is, the control section 1 implements a call-out operation for calling out to a recipient terminal having the number designated by the call-out command. Subsequently, information input to the interface 10 is subjected to an appropriate encoding process and modulation process, and then signals indicative of the information are transmitted to the recipient terminal via a telephone line (step S4).

On the other hand, if the phone number designated by the call-out command agrees with the printer function call number (if YES in step S3), the control section 1 controls the printer section 6 instead of performing the call-out operation. That is, the control section 1 sends to the printer section 6 print-out data of information input from the personal computer 15 via the interface 10, thereby allowing the printer section 6 to print out the information input via the interface 10 (step S5).

The AT command system includes an ATD command expressed in a form of "ATD****" which serves as a call-out command for sending a call-out request to a facsimile apparatus. For example, if a command of "ATD764-3351" is sent to a facsimile apparatus, the facsimile apparatus performs a call-out operation to a phone number of "764-3351".

In the facsimile apparatus 20 of the present invention, if a phone number of "123-4567", for example, is preliminarily registered as the printer function call number, information output from the personal computer 15 can be printed out in the printer section 6 by inputting an AT command of "ATD123-4567" to the interface 10.

Figure 3:
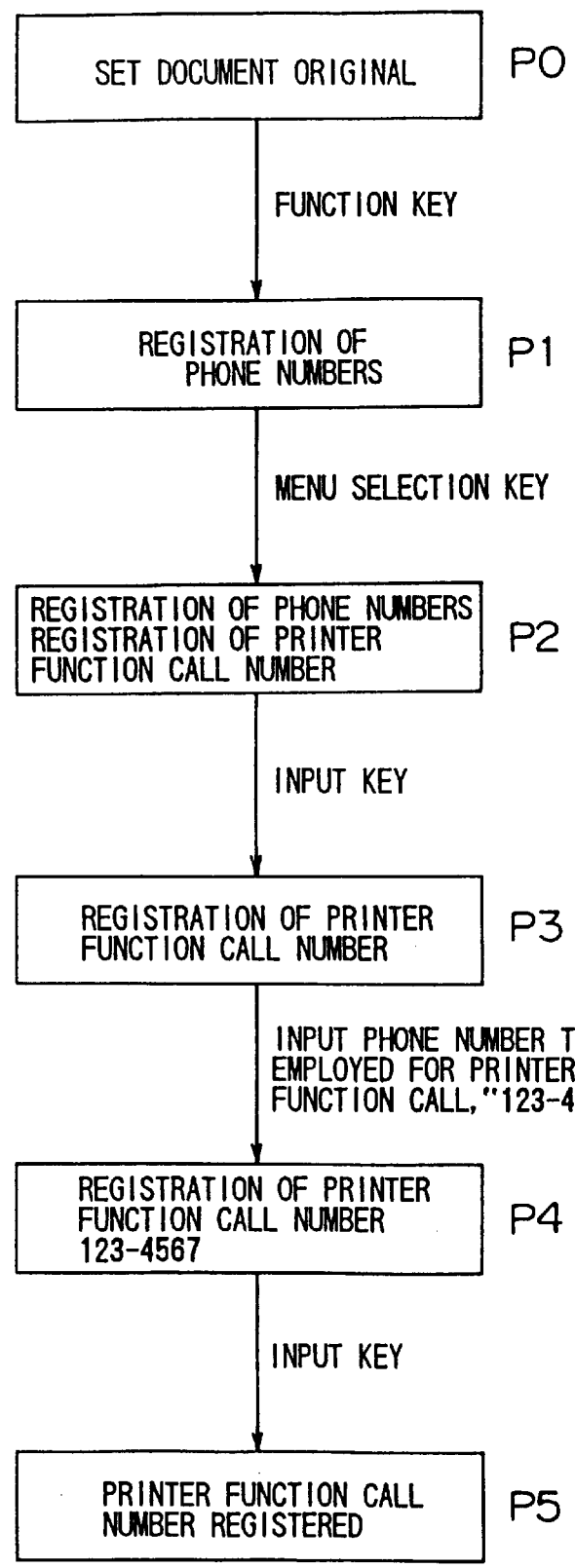
FIG. 3 is a flow chart illustrating display messages successively appearing in a display section of a facsimile apparatus when a printer function call number is registered.

FIG. 3 is a flow chart illustrating display messages successively appearing in the display section 18 of the facsimile apparatus 20 when a printer function call number is registered. When a function key for registering phone numbers is operated in a state where an initial screen P0 is displayed which prompts a user to set a document original to be transmitted, a screen P1 appears. In the registration of phone numbers, menu items for registering desired phone numbers for one-touch keys and short dialing keys and for registering the aforesaid printer function call number can be selected (screen P2).

When an input key is operated in a state where the menu item for the registration of the printer function call number (screen P2) is displayed, a screen P3 appears which prompts a user to input the printer function call number. When a number for printer function call is input in this state, a screen P4 appears. When the input key is operated, a message indicating the completion of the registration of the printer function call number (screen P5) is displayed to complete the registration operation.

In accordance with this embodiment, by implementing the call-out to operation for calling out the facsimile apparatus from the personal computer 15, a printing operation can be carried out in the facsimile apparatus 20 which cooperatively performs the PC-FAX function with the personal computer 15. Therefore, the printing operation in the facsimile apparatus 20 can be realized only simply by designating the printer function call number registered in the facsimile apparatus 20 as a phone number of a recipient terminal, without providing a special command from the personal computer 15 to the facsimile apparatus 20. Accordingly, the printer section 6 of the facsimile apparatus 20 can be shared as a printer for the personal computer 15 without altering the AT command system conventionally employed for the PC-FAX function.

Further, since the personal computer 15 performs the aforesaid operation for external input printing in substantially the same manner as the ordinary PC-FAX operation, the personal computer 15 can utilize the external input printing function by running PC-FAX application software. For example, in PC-FAX application software which is adapted to implement a PC-FAX facsimile transmission by selecting a desired phone number from preliminarily registered phone numbers, the personal computer 15 can utilize the external input printing function of the facsimile apparatus 20 simply by selecting the printer function call number.

Still further, since a modification in the construction of the facsimile apparatus should be made only in the software portion thereof for the external input printing function, an increase in cost for the modification of the facsimile apparatus can be avoided.

Figure 4:
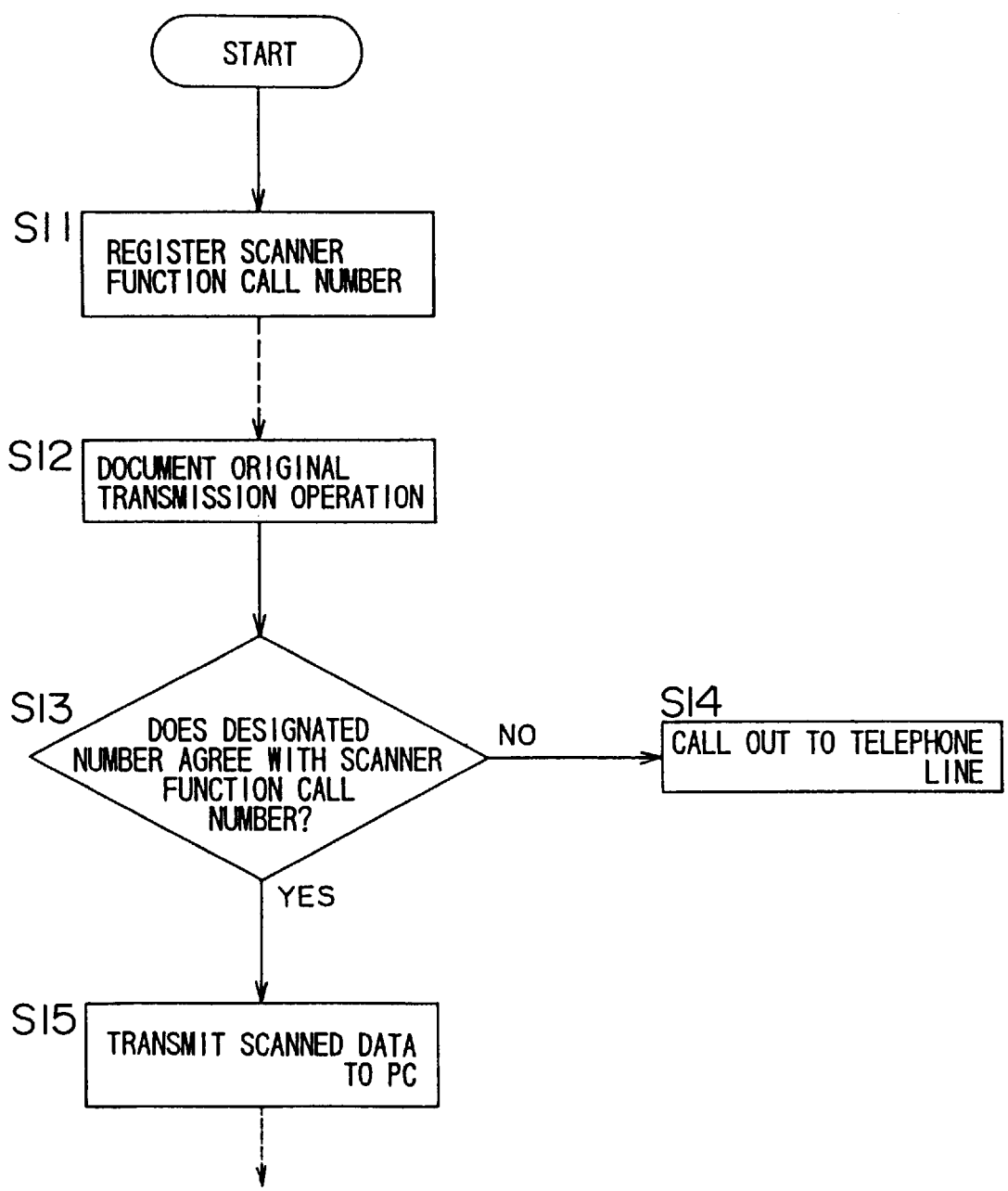
FIG. 4 is a flow chart for explaining the operation of a facsimile apparatus in relation to the sharing of a reading section 2.

FIG. 4 is a flow chart for explaining the operation of the facsimile apparatus 20 in relation to the sharing of the reading section 2 thereof. Prior to using the reading section 2 of the facsimile apparatus 20 as an image scanner for the personal computer 15, a user registers a scanner function call number (step S11). That is, when the user inputs a particular phone number by operating the operation section 7 in the step S11, the input number is registered as the scanner function call number in the memory 19.

When a transmission operation is performed after a document original is set in the reading section 2 and a phone number is input (step S12), the control section 1 judges whether the input phone number agrees with the scanner function call number registered in the memory 19 (step S13). If the input phone number does not agree with the scanner function call number (if NO in step S13), a facsimile transmission is implemented in accordance with the facsimile communication procedure. That is, the control section 1 implements a call-out operation for calling out to a recipient terminal of the input phone number. Subsequently, the image processing section 3 generates image data based on output signals of the reading section 2. The generated image data is subjected to an appropriate encoding process and appropriate modulation process, to generate transmission signals, and then the transmission signals are transmitted to the recipient terminal via a telephone line (step S14).

On the other hand, if the phone number input in the transmission operation agrees with the scanner function call number (if YES in step S13), the operation mode is switched from the ordinary operation mode to the PC-FAX mode under the control of the control section 1. When the document original is read in the PC-FAX mode, the control section 1 behaves as if it received a call-in facsimile transmission instead of performing a call-out operation, and sends image data from the image processing section 3 to the interface 10, thereby providing the personal computer 15 with the image data of the document original read by the reading section 2 via the communication cable 13 (step S15). That is, the facsimile apparatus 20 outputs the image data from the image processing section 3 to the interface 10 in the same manner as the case where the facsimile apparatus 20 sends call-in data to the personal computer 15.

Figure 5:
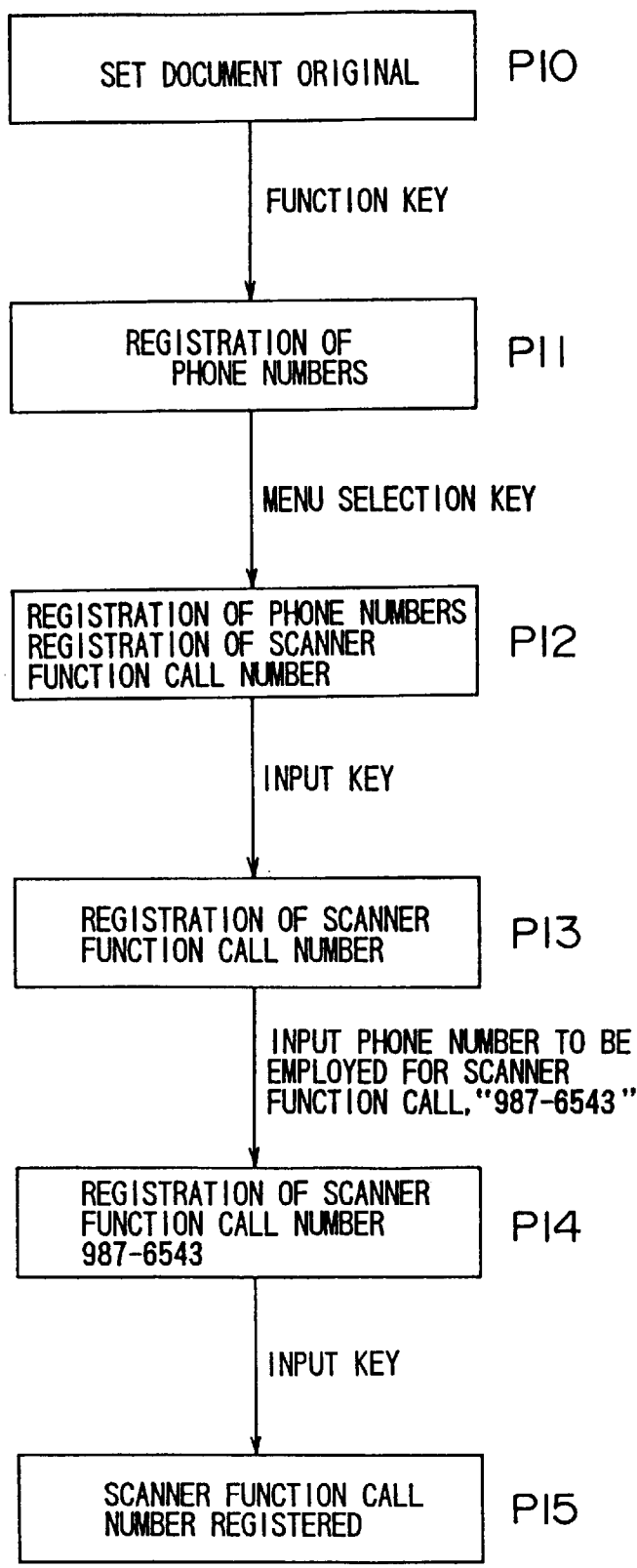
FIG. 5 is a flow chart illustrating display messages successively appearing in a display section of a facsimile apparatus when a scanner function call number is registered.

FIG. 5 is a flow chart illustrating display messages successively appearing in the display section 18 of the facsimile apparatus 20 when a scanner function call number is registered. When a function key for registering phone numbers is operated in a state where an initial screen P10 is displayed which prompts a user to set a document original to be transmitted, a screen P11 appears. In the registration of phone numbers, menu items for registering desired phone numbers for one-touch keys and short dialing keys and for registering the aforesaid scanner function call number can be selected (screen P12).

When the input key is operated in a state where the menu item for the registration of the scanner function call number (screen P12) is displayed, a screen P13 appears which prompts a user to input the scanner function call number. When a number for scanner function call is input in this state, a screen P14 appears. When the input key is operated, a message indicating the completion of the registration of the scanner function call number (screen P15) is displayed to complete the registration operation.

In accordance with this embodiment, when a transmission operation is performed with the scanner function call number, image data of a document original read by the reading section 2 is sent to the personal computer 15 via the interface 10. At this time, the facsimile apparatus 20 behaves as if it transmitted a call-in data to the personal computer 15, and the personal computer 15 performs the same operation as a call-in operation for the PC-FAX function.

Thus, the reading section 2 of the facsimile apparatus 20 which cooperatively performs the PC-FAX function with the personal computer 15, can be used as an image scanner for the personal computer 15. Accordingly, there is no need to sent a special command to the facsimile apparatus 20 from the personal computer 15. Therefore, the reading section 2 of the facsimile apparatus 20 can be shared as an image scanner for the personal computer 15 without altering the AT command system conventionally employed for the PC-FAX function.

Further, since the personal computer 15 performs the aforementioned operation for scanning in substantially the same manner as the ordinary PC-FAX operation, the personal computer 15 can utilize the scanner function by running PC-FAX application software.

Still further, since a modification in the construction of the facsimile apparatus should be made only in the software portion thereof for the scanner function, an increase in cost for the modification of the facsimile apparatus can be avoided.

Figure 6:
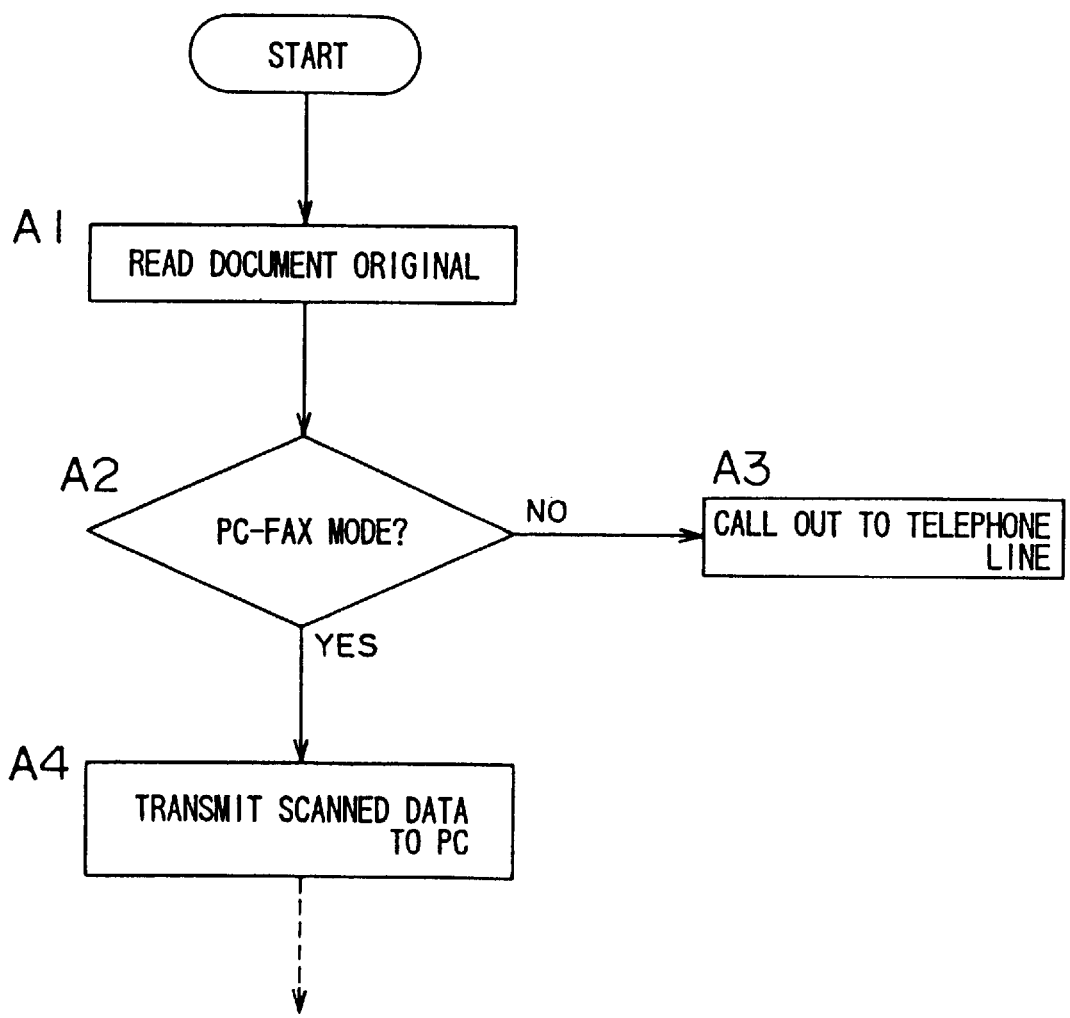
FIG. 6 is a flow chart for explaining the operation of a facsimile apparatus according to another embodiment of the present invention in relation to the sharing of a reading section 2.

FIG. 6 is a flow chart for explaining the operation of a facsimile apparatus according to another embodiment of the present invention in relation to the sharing of a reading section. Reference will be made again to FIG. 1 to describe the embodiment. In the aforesaid embodiment which realizes the sharing of the reading section 2, the operation mode of the facsimile apparatus 20 is switched to the PC-FAX mode by operating the operation section 7 of the facsimile apparatus 20. In this embodiment, on the other hand, the switching from the ordinary operation mode to the PC-FAX mode is realized by sending an AT command to the facsimile apparatus 20 from the personal computer 15.

If the reading section 2 of the facsimile apparatus 20 is to be used as an image scanner for the personal computer 15, an AT command for switching the operation mode of the facsimile apparatus 20 to the PC-FAX mode is output from the personal computer 15. Such an AT command is included in the conventionally used AT command system.

When a document original is set in the reading section 2 of the facsimile apparatus 20 and a document original reading operation is performed (step A1), the control section 1 judges whether the present operation mode is the ordinary operation mode or the PC-FAX mode (step A2). In the case of the ordinary operation mode, the control section 1 calls out a recipient terminal of a phone number input prior to a document original reading operation, and sends out to a telephone line signals indicative of image data output from the image processing section 3 (step A3).

On the other hand, in the case that the document original reading operation is designated in the PC-FAX mode, the control section 1 behaves as if it received a facsimile correspondence, and outputs from the interface 10 image data sent from the image processing section 3 (step A4). Thus, the image data of the document original read by the reading section 2 is input to the personal computer 15.

In accordance with the embodiment, the reading section 2 of the facsimile apparatus 20 can be shared as an image scanner for the personal computer 15, without altering the conventionally used AT command system.

We claim:

1. A facsimile apparatus comprising:

means for printing information:

an information input/output section having means for receiving input image information from an external information processing apparatus;

memory means storing a predetermined phone number registered therein;

judging means, responsive to a phone number input thereto, for judging whether or not the input phone number agrees with the predetermined phone number registered in said memory means;

special processing means, responsive to a judgment by said judging means that the input phone number agrees with the predetermined phone number, for actuating said printing means to print the input image information;

means for outputting the input information to a telephone line in accordance with a facsimile communication procedure in response to a judgment by said judging means that the predetermined phone number does not agree with the input phone number, for transmission of the image information to a recipient facsimile apparatus corresponding to the input phone number;

a phone number inputting means for inputting a phone number via said information input/output section or from a facsimile apparatus main body; and a document original reading means for reading a document original;

said special processing means being responsive to a judgment by said judging means that the predetermined phone number agrees with a phone number which is input by said phone number inputting means, to actuate said reading means to read document original information from the document original and output the read document original information from said information input/output section;

wherein:

the predetermined phone number includes a first phone number and a second phone number;

said special processing means being responsive to a judgment by said judging means that the first predetermined phone number agrees with a phone number which is input by said phone number inputting means, to actuate said printing means to print the input image information; and said special processing means being responsive to a judgment by said judging means that the second predetermined phone number agrees with a phone number which is input by said phone number inputting means, to actuate said reading means to read document original information from the document original and output the read document original information from said information input/output section.

2. A facsimile apparatus as set forth in claim 1, wherein said means for receiving image information comprises means for receiving the image information from a computer.

3. A facsimile apparatus as set forth in claim 1, wherein said special processing means being responsive to a judgment by said judging means that the first predetermined phone number agrees with a phone number which is input via said information input/output section by said phone number inputting means, to actuate said printing means to print the input image information.

4. A facsimile apparatus comprising:

means for printing information:

an information input/output section having means for receiving input image information from an external information processing apparatus;

memory means storing a predetermined phone number registered therein;

judging means, responsive to a phone number input thereto, for judging whether or not the input phone number agrees with the predetermined phone number registered in said memory means;

special processing means, responsive to a judgment by said judging means that the input phone number agrees with the predetermined phone number, for actuating said printing means to print the input image information;

a phone number inputting means for inputting a phone number via said information input/output section or from a facsimile apparatus main body; and a document original reading means for reading a document original;

said special processing means being responsive to a judgment by said judging means that the predetermined phone number agrees with a phone number which is input by said phone number inputting means, to actuate said reading means to read document original information from the document original and output the read document original information from said information input/output section;

wherein:

the predetermined phone number includes a first phone number and a second phone number;

said special processing means being responsive to a judgment by said judging means that the first predetermined phone number agrees with a phone number which Is input by said phone number inputting means, to actuate said printing means to print the Input Image information; and said special processing means being responsive to a judgment by said judging means that the second predetermined phone number agrees with a phone number which is input by said phone number inputting means, to actuate said reading means to read document original information from the document original and output the read document original information from said information input/output section.

5. A facsimile apparatus as set forth in claim 4, wherein said means for receiving image information comprises means for receiving the image information from a computer.

6. A facsimile apparatus as set forth in claim 4, wherein said special processing means being responsive to a judgment by said judging means that the first predetermined phone number agrees with a phone number which is input via said information input/output section by said phone number inputting means, to actuate said printing means to print the input image information.

* * * * *